US010211670B2

(12) United States Patent
Johansen

(10) Patent No.: US 10,211,670 B2
(45) Date of Patent: Feb. 19, 2019

(54) UPS WITH INTEGRATED BYPASS SWITCH

(71) Applicant: SCHNEIDER ELECTRIC IT CORPORATION, West Kingston, RI (US)

(72) Inventor: Flemming Johansen, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 263 days.

(21) Appl. No.: 14/977,873

(22) Filed: Dec. 22, 2015

(65) Prior Publication Data

US 2017/0179759 A1   Jun. 22, 2017

(51) Int. Cl.
*H02J 9/06* (2006.01)
*H02J 7/00* (2006.01)
*H02M 7/44* (2006.01)
*H02J 3/18* (2006.01)

(52) U.S. Cl.
CPC ............ *H02J 9/061* (2013.01); *H02J 3/1807* (2013.01); *H02J 7/007* (2013.01); *H02J 9/062* (2013.01); *H02M 7/44* (2013.01); *Y02E 40/30* (2013.01)

(58) Field of Classification Search
CPC ............ H02M 5/00; H02M 5/04; H02M 5/06; H02M 5/08; H02M 5/10; H02M 5/12; H02M 5/14; H02M 5/16; H02M 5/18; H02M 5/20; H02M 5/22; H02M 5/25–5/2576; H02M 2005/2932; H02M 2005/2935; H02M 2005/2937; Y02E 40/16; Y02E 40/18
USPC ......................................... 307/23
See application file for complete search history.

(56) References Cited

U.S. PATENT DOCUMENTS 6,144,191 A * 11/2000 Raedy .................. H02J 3/1807
                                                    323/207
2016/0197733 A1* 7/2016 Van Der Brug ... H05B 37/0263
                                                    315/177

FOREIGN PATENT DOCUMENTS

CN      104734312 A      6/2015
WO      20130130054 A1   9/2013
WO      2015047393 A2    4/2015

OTHER PUBLICATIONS

Extended European Search Report from corresponding European Application No. 16203497.9 dated May 4, 2017.
(Continued)

*Primary Examiner* — Patrick C Chen
(74) *Attorney, Agent, or Firm* — Lando & Anastasi, LLP

(57) ABSTRACT

According to one aspect, embodiments of the invention provide a UPS comprising a delta transformer having a primary winding and a secondary winding, the primary winding coupled between an input and an output and the secondary winding having a first end and a second end, a delta inverter coupled between a DC bus and the secondary winding, a short circuit control circuit selectively coupled between the first end and the second end of the secondary winding, a main inverter coupled between the DC bus and the output, and a controller configured to control, in a bypass mode of operation, the short circuit control circuit to couple the first end of the secondary winding to the second end such that the secondary winding is short circuited and unconditioned output AC power, derived from the input AC power via the primary winding, is provided to the output.

16 Claims, 4 Drawing Sheets

(56) References Cited

OTHER PUBLICATIONS

"Understanding Delta Conversion Online(™) "The Difference"—Part 1", American Power Conversion, Jan. 1, 2004 (Jan. 1, 2004), XP055161078, * the whole document *.

* cited by examiner

UPS WITH INTEGRATED BYPASS SWITCH

BACKGROUND OF INVENTION

Field of the Invention

At least one example in accordance with the present invention relates generally to uninterruptible power supplies (UPS).

Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS. Typical UPS's may also operate in a bypass mode where unconditioned power with basic protection is provided directly from an AC power source to a load via a bypass line.

SUMMARY

Aspects in accord with the present invention are directed to an Uninterruptible Power Supply (UPS) comprising an input configured to be coupled to an AC source and to receive input AC power from the AC source, a DC bus configured to be coupled to a DC source and to receive backup DC power from the DC source, an output configured to be coupled to at least one AC load and to provide output AC power to the at least one AC load derived from at least one of the input AC power and the backup DC power, a delta transformer having a primary winding and a secondary winding, the primary winding coupled between the input and the output and the secondary winding having a first end and a second end, a delta inverter coupled between the DC bus and the secondary winding, a short circuit control circuit selectively coupled between the first end and the second end of the secondary winding, a main inverter coupled between the DC bus and the output, and a controller configured to monitor the input AC power and, in response, control the UPS to operate in a bypass mode of operation, and to control, in the bypass mode of operation, the short circuit control circuit to couple the first end of the secondary winding to the second end such that the secondary winding is short circuited and unconditioned output AC power, derived from the input AC power via the primary winding, is provided to the output.

According to one embodiment, the short circuit control circuit includes a contactor selectively coupled between the first end and the second end of the secondary winding. In another embodiment, the UPS further comprises a mains switch selectively coupled between the input and the primary winding, wherein in the bypass mode of operation, the controller is further configured to operate the mains switch with full cycle control. In one embodiment, the controller is further configured, in an online mode of operation, to operate the short circuit control circuit to decouple the first end of the secondary winding from the second end and the delta inverter to control the input AC power by regulating current in the secondary winding of the delta transformer. In another embodiment, the controller is further configured, in the online mode of operation, to operate the delta inverter to provide Power Factor Correction (PFC) at the input. In another embodiment, the controller is further configured, in the online mode of operation, to operate the delta inverter to convert AC power from the secondary winding to DC power and provide the converted DC power to the DC bus.

According to another embodiment, the controller is further configured, in the online mode of operation, to monitor output AC voltage at the output and operate the main inverter to maintain the output AC voltage at a threshold level. In one embodiment, in response to a determination that the output AC voltage is less than the threshold level, the controller is further configured to operate the main inverter to convert DC power from the DC bus into AC power and provide the converted AC power to the output. In another embodiment, in response to a determination that the output AC voltage is greater than the threshold level, the controller is further configured to operate the main inverter to convert a portion of the output AC power to DC power and provide the converted AC power to the DC bus.

According to one embodiment, in the online mode of operation, the controller is further configured to operate the mains switch with alternating cycle control. In another embodiment, the delta inverter includes a plurality of switches coupled to the secondary winding of the delta transformer, and wherein the controller is further configured, in the bypass mode of operation, to operate the plurality of switches to short circuit the secondary winding of the delta transformer prior to operating the short circuit control circuit to couple the first end of the secondary winding to the second end. In one embodiment, the controller is further configured, in the bypass mode of operation, to operate the plurality of switches to short circuit the secondary winding of the delta transformer prior to operating the short circuit control circuit to decouple the first end of the secondary winding from the second end.

According to another embodiment, the controller is further configured, in response to a determination that the input AC power has failed, to operate, in a backup mode of operation, the main inverter to convert the backup DC power on the DC bus to AC power and provide the converted AC power to the output.

Another aspect in accord with the present invention is directed to a method for operating a UPS having an input to receive input AC power, a DC bus configured to receive backup DC power, an output configured to be coupled to at least one AC load and to provide output AC power to the at least one AC load derived from at least one of the input AC power and the backup DC power, and a delta transformer having a primary winding and a secondary winding, the primary winding coupled between the input and the output, wherein the method comprises monitoring the input AC power, determining whether a bypass mode of operation should be started, and in response to a determination that the bypass mode of operation should be started, short circuiting, in the bypass mode of operation, the secondary winding such that unconditioned output AC power, derived from the input AC power via the primary winding, is provided to the output.

According to one embodiment, the method further comprises, in response to a determination that an online mode of operation should be started, operating, in the online mode of operation, a delta inverter coupled to the secondary winding to control the input AC power by regulating current in the secondary winding of the delta transformer. In one embodiment, the method further comprises operating, in the online mode of operation, the delta inverter to provide PFC at the input. In another embodiment, the method further comprises converting, with the delta inverter in the online mode of operation, AC power from the secondary winding to DC power and providing the converted DC power to the DC bus. In one embodiment, the method further comprises, in the online mode of operation, monitoring output AC voltage at the output and operating a main inverter coupled between the DC bus and the output to maintain the output AC voltage at a level sufficient to power the at least one AC load.

According to another embodiment, short circuiting the secondary winding in the bypass mode of operation comprises operating a plurality of switches in the delta inverter to short circuit the secondary winding, and subsequent to operating the plurality of switches in the delta inverter to short circuit the secondary winding, operating a contactor coupled across the secondary winding to close.

At least one aspect in accord with the present invention is directed to an Uninterruptible Power Supply (UPS) comprising an input configured to be coupled to an AC source and to receive input AC power from the AC source, a mains switch coupled to the input, a DC bus configured to be coupled to a DC source and to receive backup DC power from the DC source, an output configured to be coupled to at least one AC load and to provide output AC power to the at least one AC load derived from at least one of the input AC power and the backup DC power, a delta transformer having a primary winding and a secondary winding, the primary winding coupled between the mains switch and the output, a delta inverter coupled between the DC bus and the secondary winding, a main inverter coupled between the DC bus and the output, and means for short circuiting, in a bypass mode of operation, the secondary winding such that unconditioned output AC power, derived from the input AC power via the mains switch and the primary winding, is provided to the output when the input AC power is at a desired level.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, typical UPS's may operate in a bypass mode where unconditioned power with basic protection is provided directly from an AC power source to a load via a bypass line. For example, conventional UPS's include an independent bypass static switch that is configured to couple an AC power source directly to a load via a bypass line when AC power provided by the AC power source is acceptable or if the UPS has malfunctioned. However, such independent bypass static switches are typically expensive as they must be rated to handle the full power provided from the AC power source to the load.

A UPS is provided herein that reduces (or even eliminates) the need for the bypass static switch and the independent bypass line while still being capable of operating in a high efficiency bypass mode. By removing the high-cost bypass static switch from the UPS, the cost of the UPS can be significantly reduced.

Figure 1:
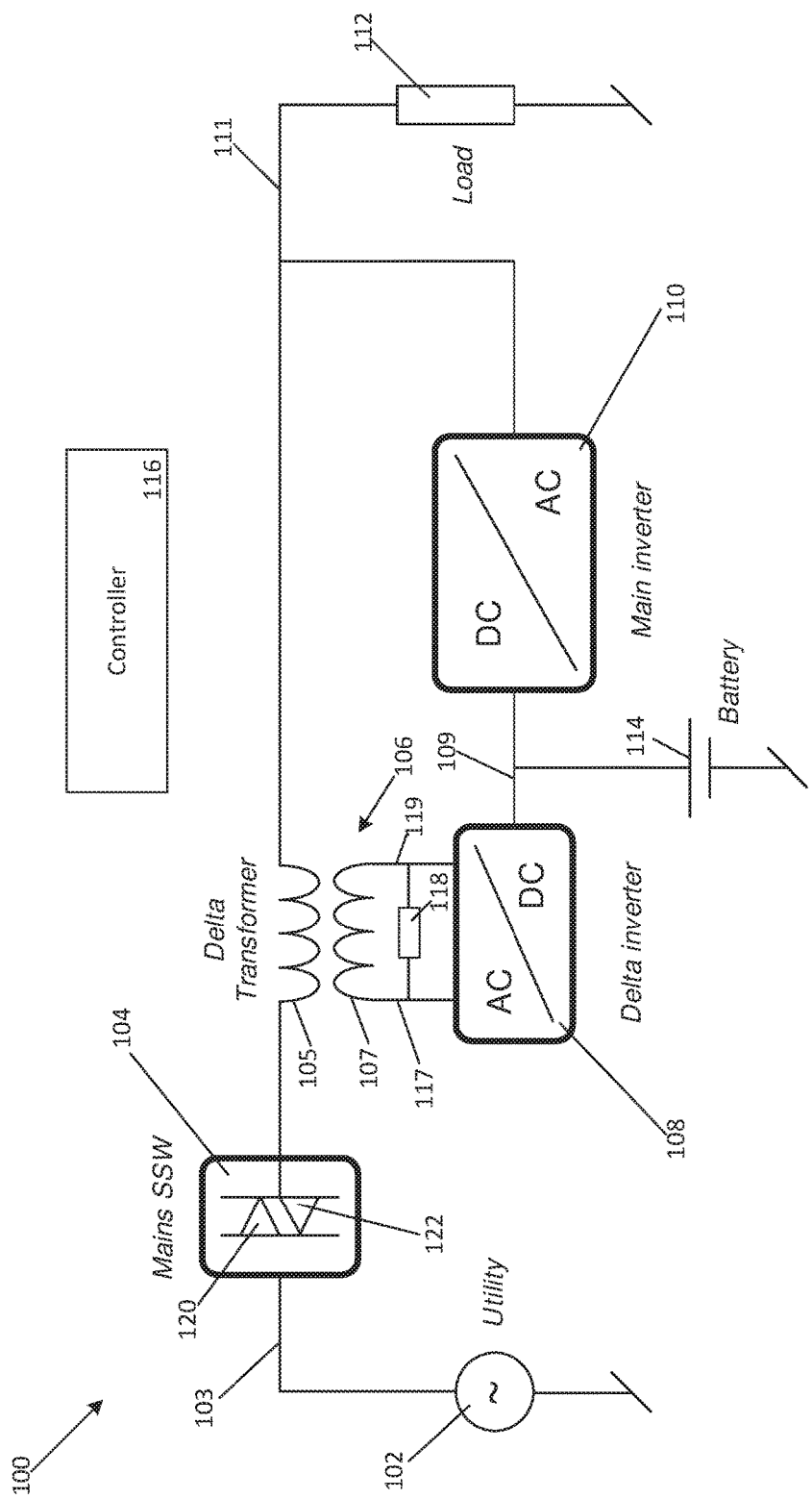
FIG. 1 is a circuit diagram of a delta conversion uninterruptible power supply in accordance with aspects of the present invention.

FIG. 1 is a block diagram of an Uninterruptible Power Supply (UPS) 100 in accordance with aspects described herein. The UPS 100 is based on a delta conversion topology. For example, according to one embodiment, the UPS 100 utilizes some aspects of a delta conversion topology as implemented in the Symmetra® MW model of UPS's sold by Schneider Electric IT Corporation of West Kingston, R.I.; however, in other embodiments, other types of delta conversion topologies may be utilized. The UPS 100 includes an input 103, a mains switch 104, a delta transformer 106, an output 111, a delta inverter 108, a main inverter 110, a DC bus 109, a battery 114, a controller 116, and a short circuit control circuit 118. The delta transformer includes a primary winding 105 and a secondary winding 107.

The AC input 103 is coupled to a first end of the primary winding 105 of the delta transformer 106 via the mains switch 104. According to one embodiment, the mains switch 104 includes a first thyristor 120 having an anode coupled to the input 103 and a cathode coupled to a first terminal of the primary winding 105 and a second thyristor 122 having a cathode coupled to the input 103 and an anode coupled to the first terminal of the primary winding 105. The other end of the primary winding 105 is coupled to the output 111. The secondary winding 107 of the delta transformer 106 is coupled to an AC interface of the delta inverter 108. A DC interface of the delta inverter 108 is coupled to a DC interface of the main inverter 110 via the DC bus 109. The battery 114 is also coupled to the DC bus 109. An AC interface of the main inverter 110 is coupled to the output 111. The output 111 is configured to be coupled to a load 112. The short circuit control circuit 118 is selectively coupled between a first end 117 of the secondary winding 107 and a second end 119 of the secondary winding 107.

The delta inverter 108 and the main inverter 110 are bidirectional devices (i.e., each is capable of converting power from AC to DC and from DC to AC). The controller 116 is configured to monitor AC input power provided to the input 103 by a power source 102 (e.g., AC mains). Based on the presence and quality of the AC input power provided to the input 103 by the power source 102, the controller 116 is configured to operate the UPS 100 in different modes of operation.

In response to a determination that the AC power provided by the input power source 102 is either lower than or greater than a desired level (e.g., is in a sag or swell condition), the controller 116 operates the UPS 100 to enter an "on-line" mode of operation. In the online mode of operation, the controller 116 operates the mains switch 104 to provide the AC input power (having an input AC voltage waveform) at the input 103 to the delta transformer 106. The controller 116 latches the first thyristor 120 during the positive portion of the received input AC voltage waveform to provide the positive portion of the received input AC voltage waveform to the delta transformer 106 and latches the second thyristor 122 during the negative portion of the received input AC voltage waveform to provide the negative portion of the received input AC voltage waveform to the delta transformer 106.

In the online mode of operation, the input AC power (e.g., from the power source 102 coupled to the input 103) is provided to the primary winding 105 of the delta transformer 106. DC power from the battery 114 is provided to the DC interface of the delta inverter 108 via the DC bus 109. The delta inverter 108 converts the DC power from the battery 114 into AC power and provides the AC power to the secondary winding 107 of the delta transformer 106. The delta inverter 108 is operated by the controller 116 to act as a current source and regulate the current in the secondary winding 107 of the delta transformer 106. By regulating the current in the secondary winding 107 of the delta transformer 106, the delta inverter 108 also controls the current through the primary winding 105 of the delta transformer 106 (i.e., the input current of the UPS 100). The current through the primary winding 105 of the delta transformer 106 (regulated by the delta inverter 108) is provided to the load 112 coupled to the output 111.

According to at least one embodiment, in the online mode of operation, the controller 116 is configured to operate the delta inverter 108 to provide power factor correction. For example, in one embodiment, the controller 116 is configured to operate the delta inverter 108 to draw only sinusoidal input current (from the power source 102) that is substantially in phase with AC voltage provided to the input 103 by the power source. This may ensure that power is drawn from the power source 102 with a unity power factor.

According to at least one other embodiment, the controller 116 is also configured to monitor a DC voltage on the DC bus 109 and operate the delta inverter 108 to regulate the amplitude of the input current of the UPS 100 to resolve any power deficiencies within the UPS 100 indicated by a low DC voltage level on the DC bus 109. For example, in response to sensing a low DC voltage level on the DC bus 109 (i.e., a DC voltage level on the DC bus below a DC bus threshold level), the controller 116 operates the delta inverter 108 to increase the input current of the UPS 100. At least a portion of the additional AC power generated by the increase in input current is received by the AC interface of the delta inverter 108 via the delta transformer 106, converted by the delta inverter 108 into DC power and provided, via the DC interface of the delta inverter 108, to the DC bus 109 to increase the DC voltage level (and consequently DC power available) on the DC bus 109.

In the online mode of operation, the controller 116 also operates the main inverter 110 to maintain AC output voltage of the UPS 100 at a level sufficient to power the load 112 coupled to the output 111. As discussed above, AC power from the primary winding 105 of the delta transformer 106 is provided to the output 111. As AC power from the primary winding 105 of the delta transformer 106 is provided to the output 111, the controller 116, via the main inverter 110, monitors the AC voltage of the AC power at the output 111. Based on the monitored AC voltage at the output 111, the controller 116 operates the main inverter 110 to act as a voltage source and maintain a relatively constant AC voltage at the output 111. For example, the controller 116 determines if the AC voltage at the output 111 is at least at an AC output voltage threshold level (i.e., a level sufficient to adequately support the load 112 coupled to the output 111).

In response to a determination that the AC voltage at the output 111 is low (i.e., is below the AC output voltage threshold level), the controller 116 operates the main inverter 110 to convert DC power from the DC bus 109, received at the DC interface of the main inverter 110, into AC power and provide the converted AC power, via the AC interface of the main inverter 110, to the output 111 to increase the AC voltage at the output 111. In response to a determination that the AC voltage at the output 111 is high (i.e., greater than the AC output voltage threshold level), the controller 116 operates the main inverter 110 to convert AC power from the output 111, received at the AC interface of the main inverter 110, into DC power (consequently decreasing the AC voltage at the output 111) and provide the converted DC power, via the DC interface of the main inverter 110, to the DC bus 109. The DC power on the DC bus 109 charges or maintains the battery 114.

In response to a determination that the AC power provided by the input power source has failed, the controller 116 operates the UPS 100 to enter a backup mode of operation. In a backup mode of operation of the UPS 100, DC power from the battery 114 is provided to the DC interface of the main inverter 110 via the DC bus 109, converted to AC power, and provided to the load coupled to the output 111 via the AC interface of the main inverter 110. Also in the backup mode of operation, the controller 116 switches off the mains switch 104 and the delta inverter 108.

In response to a determination that the AC power provided by the input power source is at a desired level, or in response to a command from a user, the controller 116 operates the UPS 100 to enter a bypass mode of operation. In the bypass mode of operation, the controller 116 operates the short circuit control circuit 118 to couple the first end 117 of the secondary winding 107 to the second end 119 of the secondary winding 107 and short circuit the secondary winding 107 of the delta transformer 106. Also in the bypass mode of operation, the controller 116 operates the mains switch 104 to provide the AC input power (having an input AC voltage waveform) at the input 103 to the primary winding 105 of the delta transformer 106. As the secondary winding 107 is short circuited, the primary winding 105 of the delta transformer 106 acts as a choke (i.e., inductor), having an inductance level defined by the stray inductance of the delta transformer 106, and the load 112 is provided unconditioned power through the mains switch 104 and the choke (i.e., primary winding 105).

By shorting the secondary winding 107 of the delta transformer 106, unconditioned power can be provided efficiently to the load 112, via the mains switch 104 and choke 105, without the need for a separate bypass line and a costly bypass switch. The short circuit control circuit 118 is discussed in greater detail below with respect to FIG. 2.

Figure 2:
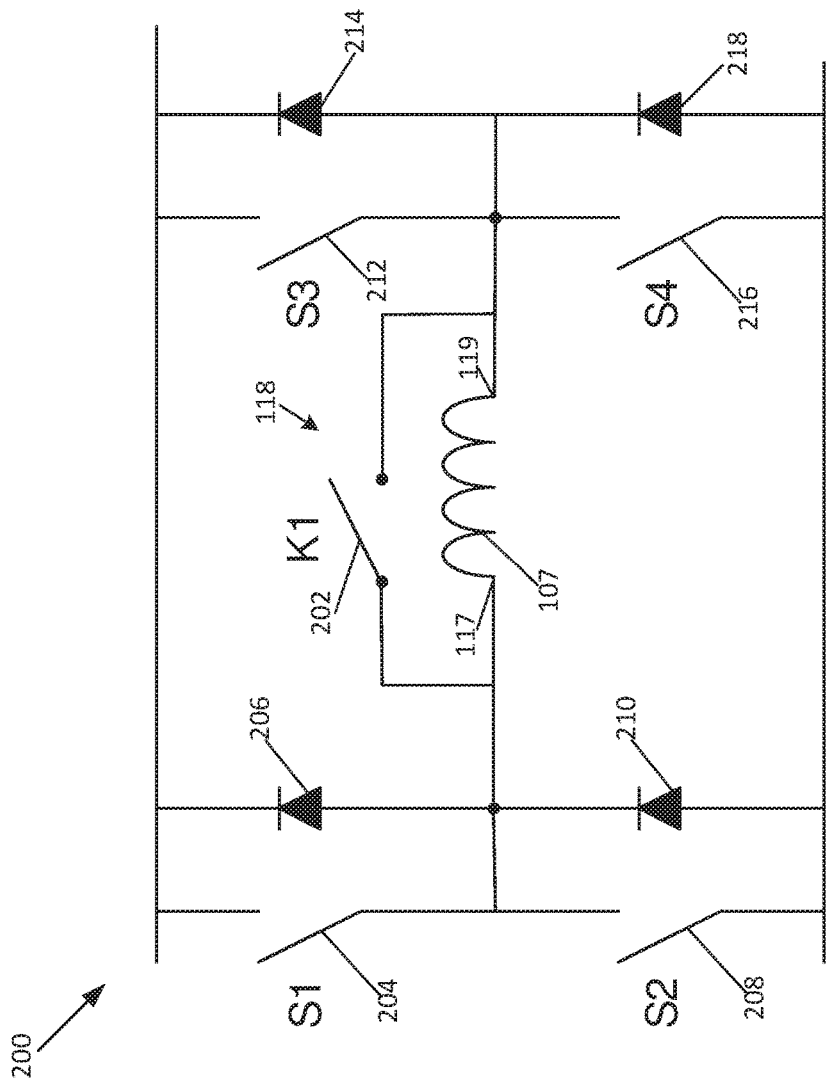
FIG. 2 is a circuit diagram illustrating an H-bridge circuit of a delta inverter and a short circuit control circuit in accordance with aspects of the present invention.

FIG. 2 is a more detailed circuit diagram showing an H-bridge 200 of the delta inverter 108 and the short circuit control circuit 118 in accordance with at least one embodiment described herein. According to one embodiment and as shown in FIG. 2, the short circuit control circuit 118 includes a contactor (K1) 202; however, in other embodiments, the short circuit control circuit 118 may include some other type of relay or switch. The contactor (K1) 202 is selectively coupled across the secondary winding 107 of the delta transformer 106 (i.e., to each end 117, 119 of the secondary winding 107). The contactor (K1) 202 is also coupled to the delta inverter 108. The H-bridge circuit 200 includes a plurality of switches and a plurality of diodes (i.e., two diodes and switches on one side of the secondary winding 107 and two diodes and switches on the other side of the secondary winding 107).

More specifically, the H-bridge circuit 200 of the delta inverter 108 includes a first switch (S1) 204, a first diode 206, a second switch (S2) 208, a second diode 210, a third switch (S3) 212, a third diode (214), a fourth switch (S4) 216, and a fourth diode 218. The anode of the first diode 206 and the cathode of the second diode 210 are each coupled to the first end 117 of the secondary winding 107. The anode of the third diode 214 and the cathode of the fourth diode 218 are each coupled to the second end 119 of the secondary winding 107. The cathode of the first diode 206 is coupled to the cathode of the third diode 214. The anode of the second diode 210 is coupled to the anode of the fourth diode 218. The first switch (S1) 204 is selectively coupled between the cathode of the first diode 206 and the first end 117 of the secondary winding 107. The second switch (S2) 208 is selectively coupled between the anode of the second diode 210 and the first end 117 of the secondary winding 107. The third switch (S3) 212 is selectively coupled between the cathode of the third diode 214 and the second end 119 of the secondary winding 107. The fourth switch (S4) 216 is selectively coupled between the anode of the fourth diode 218 and the second end 119 of the secondary winding 107. According to one embodiment, each switch 204, 208, 212, 216 in the H-bridge circuit 200 is an Insulated Gate Bipolar Transistor (IGBT); however, in other embodiments, other appropriate types of transistors or switches may be utilized.

As discussed above, in the online mode of operation, the delta inverter 108 receives DC power from the battery 114 via the DC bus 109. The controller 116 operates the delta inverter 108 (i.e., operate the switches S1 204, S2 208, S3 212, and S4 in conjunction with the diodes 206, 210, 214, 218) to convert the DC power from the battery 114 into AC power and provide the AC power to the secondary winding 107 to regulate the current in the secondary winding 107 (and consequently control current in the primary winding 105). As also discussed above, the controller 116 may operate the delta inverter 108 (i.e., operate the switches S1 204, S2 208, S3 212, and S4 in conjunction with the diodes 206, 210, 214, 218) to provide power factor correction at the input and/or regulate the amplitude of the input current of the UPS 100 to resolve any power deficiencies within the UPS 100.

In the bypass mode of operation, the controller 116 operates the short circuit control circuit 118 (i.e., contactor (K1) 202) to close, coupling the first end 117 of the secondary winding 107 to the second end 119 of the secondary winding 107 and short circuiting the secondary winding 107 of the delta inverter 108. As the secondary winding 107 is short circuited, the primary winding 105 of the delta transformer 106 acts as a choke (i.e., inductor), having an inductance level defined by the stray inductance of the delta transformer 106. Operation of the short circuit control circuit 118 is discussed in greater detail below with respect to FIGS. 3-4.

Figure 3:
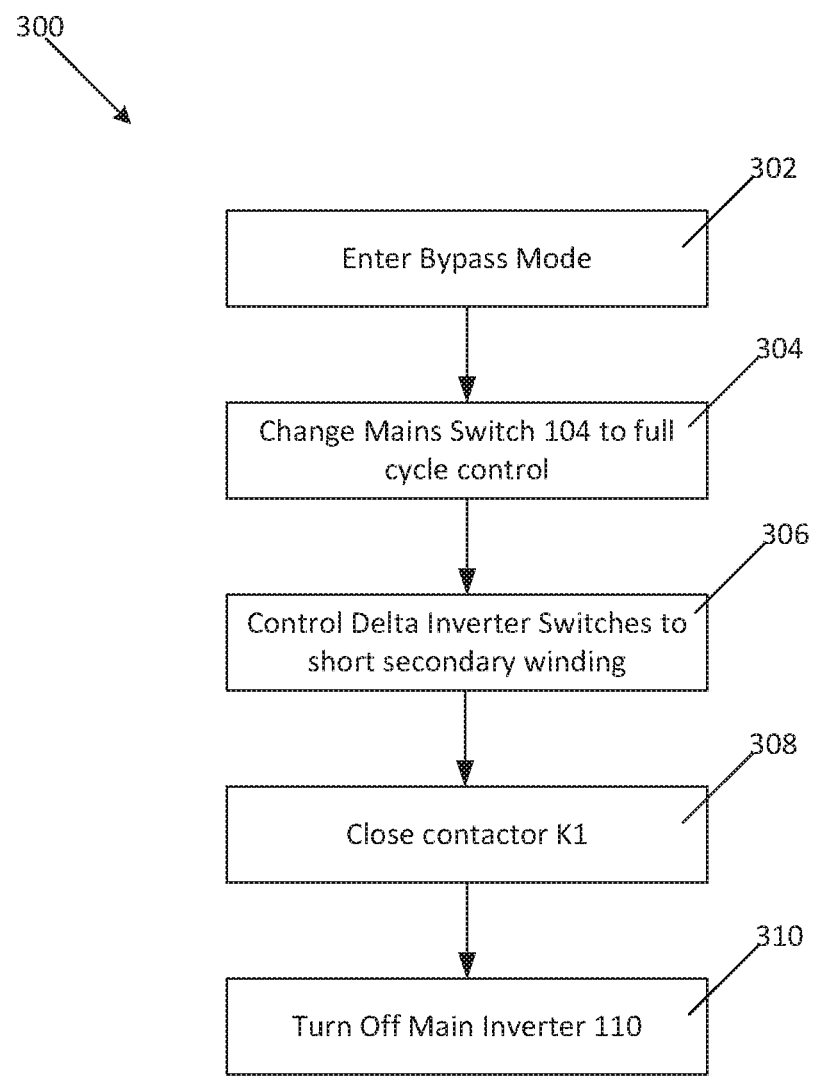
FIG. 3 is a flow chart of a process for operating a short circuit control circuit in accordance with aspects of the present invention.

FIG. 3 is a flow chart of a process 300 for operating the short circuit control circuit 118 to transition into the bypass mode of operation in accordance with aspects described herein. At block 302, in response to sensing that the AC power provided by the input power source to the UPS 100 is at a desired level, or in response to a user command, the controller 116 determines that the UPS 100 should be operated in the bypass mode of operation.

At block 304, in response to determining that the UPS 100 should be operated in the bypass mode of operation, the controller 116 changes the operation of the mains switch from alternating cycle control (i.e., where the first thyristor 120 is latched during the positive portion of the received input AC voltage waveform to provide the positive portion of the received input AC voltage waveform to the delta transformer 106 and the second thyristor 122 is latched during the negative portion of the received input AC voltage waveform to provide the negative portion of the received input AC voltage waveform to the delta transformer 106) to full cycle control in which both the first thyristor 120 and second thyristor 122 are constantly latched over a full cycle such that the full received input AC voltage waveform is provided to the primary winding 105.

At block 306, after the mains switch 104 is operated with full cycle control, the delta inverter 108 is operated by the controller 116 to short circuit the secondary winding 107 of the delta transformer 106. According to one embodiment, in short circuiting the secondary winding 107, the controller 116 operates the second switch (S2) 208 and the fourth switch 216 to close, coupling the first end 117 of the secondary winding 107 to the second end 119 of the secondary winding 107. According to another embodiment, in short circuiting the secondary winding 107, the controller 116 operates the first switch (S1) 204 and the third switch 212 to close, coupling the first end 117 of the secondary winding 107 to the second end 119 of the secondary winding 107.

At block 308, after the secondary winding 107 is short circuited by the delta inverter 108, the contactor (K1) 202 is closed, coupling the first end 117 of the secondary winding 107 to the second end 119 of the secondary winding 107. Once the secondary winding 107 is shorted by the delta inverter 108, unconditioned power from the input 103 can be provided efficiently to the load 112, via the mains switch 104 and choke 105 and consequently, at block 310, the main inverter 110 is switched off.

As described above and shown in FIG. 3, the main inverter 110 is switched off (at block 310) after the contactor (K1) 202 is closed (at block 308); however, in at least other embodiment, the main inverter 110 is switched off before the contactor (K1) 202 is closed (i.e., blocks 308 and 310 are interchanged).

Figure 4:
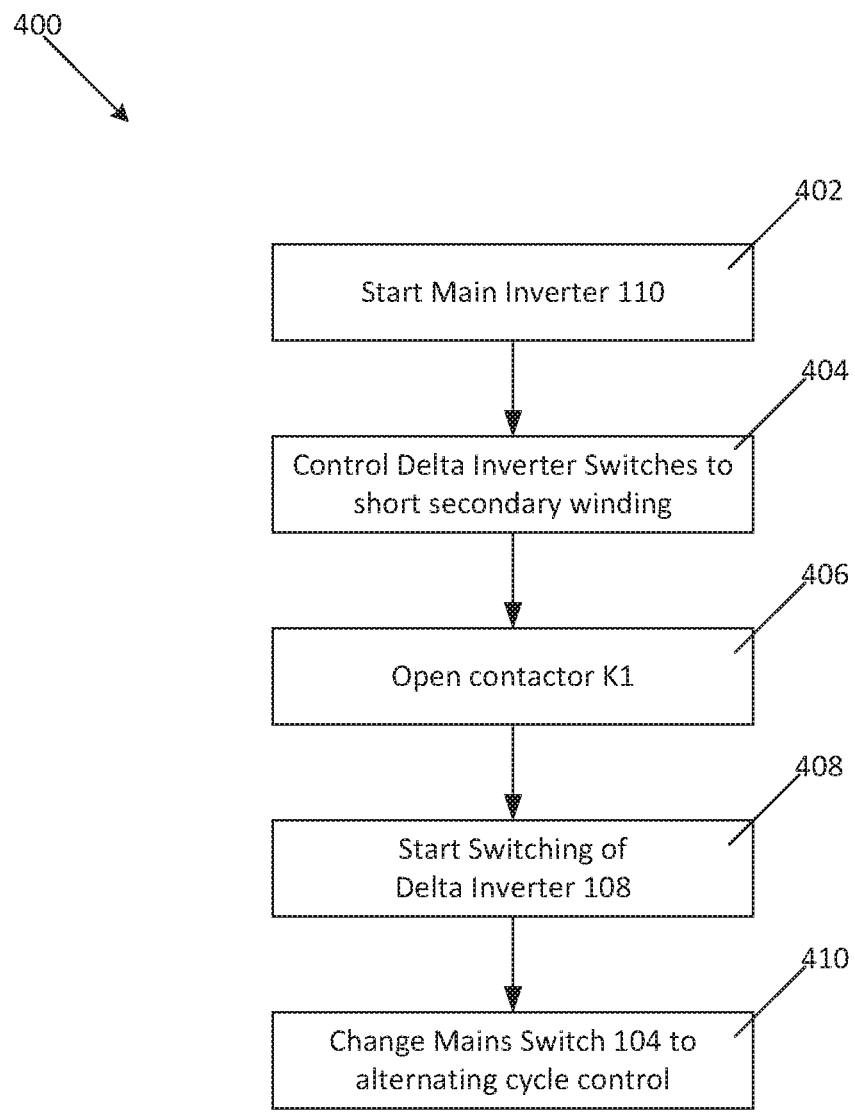
FIG. 4 is a flow chart of a process for operating a short circuit control circuit in accordance with aspects of the present invention.

FIG. 4 is a flow chart of a process 400 for operating the short circuit control circuit 118 to transition out of the bypass mode of operation in accordance with aspects described herein. At block 402, in response to sensing that the AC power provided by the input power source to the UPS 100 is not at a desired level, or in response to a user command, the controller 116 determines that the UPS 100 should be operated in the online or backup mode of operation and controls the main inverter 110 to turn on.

At block 404, after the main inverter 110 is turned on, the delta inverter 108 is operated by the controller 116 to short circuit the secondary winding 107 of the delta transformer 106. According to one embodiment, in short circuiting the secondary winding 107, the controller 116 operates the second switch (S2) 208 and the fourth switch (S4) 216 to close, coupling the first end 117 of the secondary winding 107 to the second end 119 of the secondary winding 107. According to another embodiment, in short circuiting the secondary winding 107, the controller 116 operates the first switch (S1) 204 and the third switch (S3) 212 to close, coupling the first end 117 of the secondary winding 107 to the second end 119 of the secondary winding 107.

At block 406, after the secondary winding 107 is short circuited by the delta inverter 108, the contactor (K1) 202 is opened. At block 408, after the contactor (K1) 202 is opened, the controller 108 operates the switching of the delta inverter 108 as described above and at block 410, the controller 116 changes the operation of the mains switch 104 from full cycle control to alternating cycle control. For example, in the online mode of operation, the controller 116 operates the delta inverter 108 (i.e., operate the switches S1 204, S2 208, S3 212, and S4 in conjunction with the diodes 206, 210, 214, 218) to convert DC power from the battery 114 into AC power and provide the AC power to the secondary winding 107 to regulate the current in the secondary winding 107 (and consequently control current in the primary winding 105). As also discussed above, once the mains switch 104 is operated in alternating cycle control, the controller 116 may also operate the delta inverter 108 (i.e., operate the switches S1 204, S2 208, S3 212, and S4 in conjunction with the diodes 206, 210, 214, 218) to provide power factor correction at the input. In at least one embodiment, the controller 116 may also operate the delta inverter 108 to regulate the amplitude of the input current of the UPS 100 to resolve any power deficiencies within the UPS 100.

As discussed above, by short circuiting the secondary winding 107 in the bypass mode of operation, the primary winding 105 of the delta transformer 106 acts as a choke (i.e., inductor) and unconditioned power from the input 103 can be provided efficiently to the load 112, via the mains switch 104 and choke 105, without the need for a separate bypass line and a costly bypass switch. In addition, by operating the delta inverter 108 to short circuit the secondary winding 107 prior to closing/opening the contactor (K1) 202, the timing of the transition to/from the bypass mode of operation can be in the microsecond domain. Furthermore, by shorting the secondary winding 107 with the contactor (K1) 202 in addition to shorting the secondary winding 107 with the switches of the delta inverter 108, unintended operation of the secondary winding 107 while in bypass mode (e.g., due to residual currents in the delta inverter 108 or an overload) can be prevented.

As the choke (i.e., primary winding 105) is in series with the load 112, the size of the choke will determine the voltage drop across the choke. Accordingly, the inductance level of the choke may be configured to generate an acceptable voltage drop. For example, in one embodiment, the inductance of the choke (i.e., primary winding 105) is configured to provide a voltage drop of less than 5%; however, in other embodiments, the inductance of the choke (i.e., primary winding 105) may be configured differently.

As discussed above, when transitioning to bypass mode, the secondary winding 107 is shorted by both the delta inverter 108 and the contactor (K1) 202; however, in at least one other embodiment, the contactor (K1) 202 is removed and when transitioning to/from bypass mode, the secondary winding 107 is only shorted by the delta inverter 108 (i.e., by the switches of the delta inverter 108).

As discussed above, the delta inverter 108 includes an H-bridge circuit 200; however, in other embodiments, the delta inverter 108 may be configured differently.

As also discussed above, a single UPS 100 is described; however, in at least one other embodiment, multiple UPS's 100 can be coupled together in parallel. As also described above, a system for operating a delta conversion UPS in bypass mode is described; however, in other embodiments, the system may be utilized with a single-phase UPS, a three-phase UPS, or some other type of power conditioner.

According to at least one embodiment, the UPS 100 may also include a separate bypass line that is configured to couple the input 103 to the output 111 when maintenance is desired to be performed on the components of the system.

Embodiments described herein provide a UPS that reduces (or even eliminates) the need for a traditional bypass static switch while still being capable of operating in a high efficiency bypass mode. By removing the high-cost bypass static switch from the UPS, the cost of the UPS can be significantly reduced. More specifically, because the contactor (K1) 202 is located on the low current side of the delta transformer 106 (i.e., across the secondary winding 107), the rating of the contactor (K1) 202 can be much lower than that of a traditional (fully rated) bypass switch. For example, in one embodiment, the contactor (K1) 202 is only rated to 10% of the full current of the UPS 100; however, in other embodiments, the contactor (K1) 202 may be any other appropriate rating. As the rating of the contactor (K1) 202 is relatively low, the cost for the contactor (K1) 202 is also less than a traditional bypass switch and the cost of the corresponding UPS can be reduced.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
an input configured to be coupled to an AC source and to receive input AC power from the AC source;
a DC bus configured to be coupled to a DC source and to receive backup DC power from the DC source;
an output configured to be coupled to at least one AC load and to provide output AC power to the at least one AC load derived from at least one of the input AC power and the backup DC power;
a delta transformer having a primary winding and a secondary winding, the primary winding coupled between the input and the output and the secondary winding having a first end and a second end;

a delta inverter coupled between the DC bus and the secondary winding;
a short circuit control circuit selectively coupled between the first end and the second end of the secondary winding;
a main inverter coupled between the DC bus and the output;
a mains switch selectively coupled between the input and the primary winding; and
a controller configured to:
monitor the input AC power and, in response, control the UPS to operate in a bypass mode of operation;
control, in the bypass mode of operation, the short circuit control circuit to couple the first end of the secondary winding to the second end such that the secondary winding is short circuited and unconditioned output AC power, derived from the input AC power via the primary winding, is provided to the output;
operate, in the bypass mode of operation the mains switch with full cycle control;
monitor the output AC power and, in response, control the UPS to operate in an online mode of operation;
operate, in the online mode of operation, the short circuit control circuit to decouple the first end of the secondary winding from the second end and operate the delta inverter to control the input AC power by regulating current in the secondary winding of the delta transformer; and
operate, in the online mode of operation, the mains switch with alternating cycle control.

2. The UPS of claim 1, wherein the short circuit control circuit includes a contactor selectively coupled between the first end and the second end of the secondary winding.

3. The UPS of claim 1, wherein the controller is further configured, in the online mode of operation, to operate the delta inverter to provide Power Factor Correction (PFC) at the input.

4. The UPS of claim 1, wherein the controller is further configured, in the online mode of operation, to operate the delta inverter to convert AC power from the secondary winding to DC power and provide the converted DC power to the DC bus.

5. The UPS of claim 1, wherein the controller is further configured, in the online mode of operation, to monitor output AC voltage at the output and operate the main inverter to maintain the output AC voltage at a threshold level.

6. The UPS of claim 5, wherein, in response to a determination that the output AC voltage is less than the threshold level, the controller is further configured to operate the main inverter to convert DC power from the DC bus into AC power and provide the converted AC power to the output.

7. The UPS of claim 5, wherein, in response to a determination that the output AC voltage is greater than the threshold level, the controller is further configured to operate the main inverter to convert a portion of the output AC power to DC power and provide the converted AC power to the DC bus.

8. The UPS of claim 1, wherein the delta inverter includes a plurality of switches coupled to the secondary winding of the delta transformer, and wherein the controller is further configured, in the bypass mode of operation, to operate the plurality of switches to short circuit the secondary winding of the delta transformer prior to operating the short circuit control circuit to couple the first end of the secondary winding to the second end.

9. The UPS of claim 8, wherein the controller is further configured, in the bypass mode of operation, to operate the plurality of switches to short circuit the secondary winding of the delta transformer prior to operating the short circuit control circuit to decouple the first end of the secondary winding from the second end.

10. The UPS of claim 1, wherein the controller is further configured, in response to a determination that the input AC power has failed, to operate, in a backup mode of operation, the main inverter to convert the backup DC power on the DC bus to AC power and provide the converted AC power to the output.

11. A method for operating a UPS having an input to receive input AC power, a DC bus configured to receive backup DC power, an output configured to be coupled to at least one AC load and to provide output AC power to the at least one AC load derived from at least one of the input AC power and the backup DC power, a mains switch coupled to the input, and a delta transformer having a primary winding and a secondary winding, the primary winding coupled between the mains switch and the output, wherein the method comprises:
monitoring the input AC power;
determining whether a bypass mode of operation should be started;
in response to a determination that the bypass mode of operation should be started, operating the mains switch with full cycle control and, short circuiting, in the bypass mode of operation, a first end of the secondary winding to a second end of the secondary winding such that unconditioned output AC power, derived from the input AC power via the primary winding, is provided to the output; and
in response to a determination that an online mode of operation should be started, operating the mains switch with alternating cycle control, decoupling, in the online mode of operation, the first end of the secondary winding from the second end of the secondary winding, and operating, in the online mode of operation, a delta inverter coupled to the secondary winding to control the input AC power by regulating current in the secondary winding of the delta transformer.

12. The method of claim 11, further comprising operating, in the online mode of operation, the delta inverter to provide Power Factor Correction (PFC) at the input.

13. The method of claim 11, further comprising converting, with the delta inverter in the online mode of operation, AC power from the secondary winding to DC power and providing the converted DC power to the DC bus.

14. The method of claim 11, further comprising, in the online mode of operation, monitoring output AC voltage at the output and operating a main inverter coupled between the DC bus and the output to maintain the output AC voltage at a level sufficient to power the at least one AC load.

15. The method of claim 11, wherein short circuiting the secondary winding in the bypass mode of operation comprises:
operating a plurality of switches in the delta inverter to short circuit the secondary winding; and
subsequent to operating the plurality of switches in the delta inverter to short circuit the secondary winding, operating a contactor coupled across the secondary winding to close.

16. An Uninterruptible Power Supply (UPS) comprising:
an input configured to be coupled to an AC source and to receive input AC power from the AC source;
a mains switch coupled to the input;

a DC bus configured to be coupled to a DC source and to receive backup DC power from the DC source;

an output configured to be coupled to at least one AC load and to provide output AC power to the at least one AC load derived from at least one of the input AC power and the backup DC power;

a delta transformer having a primary winding and a secondary winding, the primary winding coupled between the mains switch and the output;

a delta inverter coupled between the DC bus and the secondary winding;

a main inverter coupled between the DC bus and the output; and means for short circuiting, in a bypass mode of operation, a first end of the secondary winding with a second end of the secondary winding such that unconditioned output AC power, derived from the input AC power via the mains switch, operated with full cycle control, and the primary winding, is provided to the output when the input AC power is at a desired level, for decoupling, in an online mode of operation, the first end of the secondary winding from the second end of the secondary winding, such that the input AC power drawn via the mains switch, operated with alternating cycle control, is controlled by the delta inverter when the input AC power is not at a desired level.

\* \* \* \* \*